US008218849B2

(12) United States Patent
Lu et al.

(10) Patent No.: US 8,218,849 B2
(45) Date of Patent: Jul. 10, 2012

(54) METHOD AND SYSTEM FOR AUTOMATIC LANDMARK DETECTION USING DISCRIMINATIVE JOINT CONTEXT

(75) Inventors: Xiaoguang Lu, Plainsboro, NJ (US); Bogdan Georgescu, Plainsboro, NJ (US); Dorin Comaniciu, Princeton Junction, NJ (US); Arne Littmann, Erlangen (DE); Edgar Mueller, Heroldsbach (DE)

(73) Assignee: Siemens Corporation, Iselin, NJ (US)

( * ) Notice: Subject to any disclaimer, the term of this patent is extended or adjusted under 35 U.S.C. 154(b) by 575 days.

(21) Appl. No.: 12/549,461

(22) Filed: Aug. 28, 2009

(65) Prior Publication Data

US 2010/0067764 A1   Mar. 18, 2010

Related U.S. Application Data

(60) Provisional application No. 61/094,199, filed on Sep. 4, 2008.

(51) Int. Cl.
*A61B 6/03* (2006.01)
(52) U.S. Cl. ...................................... 382/131
(58) Field of Classification Search ........... 382/128–132
See application file for complete search history.

(56) References Cited

U.S. PATENT DOCUMENTS

| 6,961,454 | B2 | 11/2005 | Jolly |
| 7,321,676 | B2 | 1/2008 | Lavi et al. |
| 2005/0003143 | A1 | 1/2005 | Ducauchuis et al. |

OTHER PUBLICATIONS

Cousty, Jean, et al., "Automated, Accurate and Fast Segmentation of 4D Cardiac MR Images", in Functional Imaging and Modeling of the Heart, LNCS 4466, 2007, pp. 474-483.
Finn, J. Paul, et al., "Cardiac MR Imaging: State of the Technology", Radiology, vol. 241, No. 2, pp. 338-354, 2006.
Frangi, Alejandro F., et al., "Three-Dimensional Modeling for Functional Analysis of Cardiac Images: A Review", IEEE Transactions on Medical Imaging, vol. 20, No. 1, Jan. 2001.
Georgescu, B, et al., "Database-Guided Segmentation of Anatomical Structures with Complex Appearance", In Proc. IEEE CVPR, 2005.
Tu, Zhuowen "Probabilistic Boosting-Tree: Learning Discriminative Models for Classification, Recognition, and Clustering", in Proc. ICCV, 2005, pp. 1589-1596.
Viola, Paul, et al., "Robust Real-Time Face Detection", International Journal of Computer Vision, vol. 57, No. 2, pp. 137-154, 2004.
Young, Alistair, et al., "Left Ventricular Mass and Volume: Fast Calculation with Guide-Point Modeling on MR Images", Radiology, vol. 216, No. 2, pp. 597-602, 2000.
Zheng, Yefang, et al., "Fast Automatic Heart Chamber Segmentation from 3D CT Data using Marginal Space Learning and Steerable Features", in Proc. ICCV, 2007, pp. 1-8.
Jolly, Marie-Pierre, "Automatic Segmentation of the Left Ventricle in Cardiac MR and CT Images", International Journal of Computer Vision, vol. 70, No. 2, pp. 151-163, 2006.
Koikkalainen, Juha, et al., "Segmentation of Cardiac Structures Simultaneously from Short- and Long-Axis MR Images", in Proc. MICCAI, pp. 427-434, 2004.

*Primary Examiner* — Toan Ton
*Assistant Examiner* — John Corbett

(57) ABSTRACT

A method and system for detecting anatomic landmarks in medical images is disclosed. In order to detect multiple related anatomic landmarks, a plurality of landmark candidates are first detected individually using trained landmark detectors. A joint context is then generated for each combination of the landmark candidates. The best combination of landmarks in then determined based on the joint context using a trained joint context detector.

31 Claims, 6 Drawing Sheets

METHOD AND SYSTEM FOR AUTOMATIC LANDMARK DETECTION USING DISCRIMINATIVE JOINT CONTEXT

This application claims the benefit of U.S. Provisional Application No. 61/094,199, filed Sep. 4, 2008, the disclosure of which is herein incorporated by reference.

BACKGROUND OF THE INVENTION

The present invention relates to medical imaging of the heart, and more particularly, to automatic detection of anatomic landmarks of the left ventricle in magnetic resonance long axis image slices.

Cardiovascular disease is the leading cause of death in developed countries. Early diagnosis can be effective in reducing the mortality of cardiovascular disease. Quantification of the left ventricle (LV) is of particular interest among the four heart chambers because it pumps oxygenated blood from the heart to the rest of the body. In particular, precise measurements of both the dimensions and functions of the LV are essential in clinical applications for diagnosis, prognostic, and therapeutic decisions. Magnetic resonance (MR) imaging can accurately depict cardiac structure, function, perfusion, and myocardial viability, and precise measurements can be achieved using MR imaging. Accordingly, MRI is widely accepted as the standard for heart chamber quantification. However, due to the considerable amount of information available, analysis, such as segmentation, of cardiac images for functionality quantification is time consuming and error-prone for human operators. Thus, automated methods for analyzing MR images are needed.

In MR scans, long axis slices are used as scout images for acquisition planning, as well as to complement a stack of short axis slices. Long axis slices capture the LV's shape information and can also be used to correct mis-registration of the short axis stack. Long axis acquisitions can be an image sequence of long axis slices or a single slice that is scanned during MR acquisition planning. Anatomic landmarks in an MR long axis slice can be used for higher level segmentation, such as initialization of deformable model based approaches, and for accelerating acquisition time of a full MR scan by facilitating fully automatic planning of cardiac MR examinations. Thus, automatic detection of anatomic landmarks in a cardiac MR long axis slice is desirable.

BRIEF SUMMARY OF THE INVENTION

The present invention provides a method and system for automatic anatomic landmark detection in medical images based on a joint context of multiple anatomic landmarks. Embodiments of the present invention utilize a joint context based approach under a learning-based object detection framework to automatically identify a set of interrelated anatomic landmarks in medical images.

In one embodiment of the present invention, in order to detect multiple related anatomic landmarks, a plurality of landmark candidates are first detected individually using trained landmark detectors. A joint context is then generated for each combination of the landmark candidates. The best combination of landmarks is then determined based on the joint context using a trained joint context detector.

In another embodiment of the present invention, anatomic landmarks of the left ventricle (LV) are detected in a magnetic resonance (MR) long axis image slice. Apex candidates and base plane candidates are detected in the MR long axis image slice using a trained apex detector and a trained base plane detector, respectively. A joint context is then generated for each apex-base plane candidate pair. The best apex-base plane candidate pair is then determined based on the generated joint context using a trained joint context detector.

These and other advantages of the invention will be apparent to those of ordinary skill in the art by reference to the following detailed description and the accompanying drawings.

DETAILED DESCRIPTION

The present invention is directed to a method and system for automatic landmark set detection in medical images based on a joint context of multiple anatomic landmarks. For example, embodiments of the present invention can detect anatomic landmarks in medical images such as magnetic resonance (MR) images, computed tomography (CT) images, X-ray images, ultrasound images, etc. Embodiments of the present invention are described herein to give a visual understanding of the anatomic landmark detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Learning based object detection approaches have been demonstrated to be successful in many applications, but still encounter challenges in a cluttered environment, such as landmark detection in MR long axis slices, due to varying MR acquisition parameters and large anatomy shape and appearance variations in different patients. In anatomic landmark detection, context of a landmark is local evidence, such as shape and appearance, of the landmark in an image. Each individual anatomic landmark has limited local evidence in an image to indentify. However, a set of anatomic landmarks in an image may not be independent with respect to each other. In particular a set of landmarks may have a semantic relationship, where their shape and appearance in an image are correlated. For example, a set of anatomic landmarks may belong to the same anatomy, such as the landmarks of the basal annulus points and the apex of the left ventricle (LV). Correlation in shape and appearance among landmarks can be crucial to indentify a landmark set in its entirety. For example each basal annulus point of the LV has limited context individually. However, the joint context of the two basal annulus points includes the base plane region, which has more discriminative power than the basal annulus points individually.

For such anatomic landmarks that have semantic connections, joint contextual information captures the correlation of shape and appearance constructed from the landmark set, which includes more evidence and helps resolve ambiguities in detecting each landmark individually. Accordingly, embodiments of the present invention utilize a joint context based approach under a learning-based object detection framework to automatically indentify a landmark set. A mapping calculated from a landmark set is used to derive a joint contextual regions, where features are automatically learned to build a discriminative classifier used to detect the landmark set in input medical images.

Figure 1:
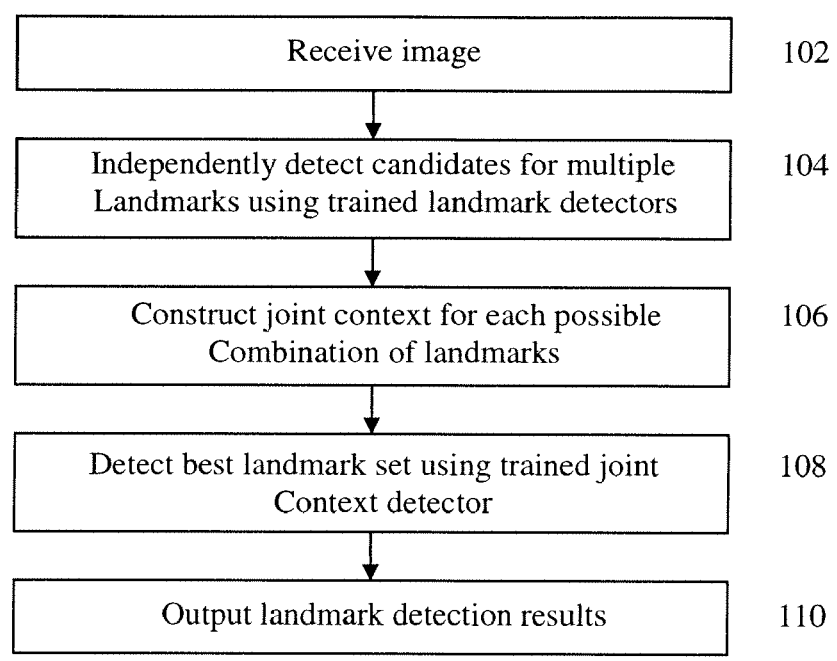
FIG. 1 illustrates a method of automatic anatomic landmark detection according to an embodiment of the present invention.

FIG. 1 illustrates a method of automatic anatomic landmark detection according to an embodiment of the present invention. The method of FIG. 1 transforms medical image data representing anatomy of a patient to detect a particular set of anatomic landmarks in the medical image data. At step 102, a medical image is received. The medical image can be generated using any type of medical imaging modality, such as MR, CT, X-ray, ultrasound, etc. The medical image can be received directly from an image acquisition device (e.g., MR scanner, CT scanner, etc.). It is also possible that the medical image can be received by loading a medical image that was previously stored, for example on a memory or storage of a computer system or a computer readable medium.

At step 104, candidates are detected independently for multiple anatomic landmarks in the image using trained landmark detectors. According to an embodiment of the present invention, the multiple anatomic landmarks have a semantic relationship. For example, each of the landmarks may be a part of the same anatomy, such as part of the same organ. For each anatomic landmark, an independent landmark detector is trained to detect the landmark based on context of the landmark. In order to utilize context for landmark detection, a discriminative model is trained to differentiate the true object from background by calculating the probability of a given context of a hypothesis being a target object, denoted as P(O|C). Landmark detection is formulated as a two-category classification problem, i.e., true object vs. background. Discriminative features from the context are extracted and learned using a machine learning technique based on training data that is annotated with ground truth anatomic landmarks. This results in a probabilistic model (i.e., landmark detector) for each landmark context. Once such landmark detectors are trained based on the training data, the online landmark detection step (104) utilizes the trained landmark detector to search through multiple hypotheses in the parameter space to identify landmark candidates with high probabilities.

Context-based landmark detection is used to estimate a parameter set $\theta$ of each anatomic landmark in the received medical image. According to an embodiment of the present invention, in a 2D image, there are five parameters for each anatomic landmark context, including two position parameters (x, y), one orientation parameter ($\phi$), and two scale parameters (sx, sy). Because exhaustively searching in the five-dimensional space is expensive for online applications, marginal space learning (MSL) can be used in training a series of detectors (classifiers) to detect these parameters for each anatomic landmark. For each learning/classification task, a probabilistic boosting tree (PBT) can be used as the classifier. A PBT classifier boosts the performance of weak classifiers to generate a strong tree-structure classifier. Each trained classifier is a tree-based structure with which the posterior probabilities of the presence of the landmark of interest are calculated from the candidate context in the image. Following the MSL strategy, for each landmark detector a series of classifiers estimate the parameters at a number of sequential stages in order of complexity, i.e., translation (position), orientation, and scale. Different stages utilize features calculated from image intensities. Multiple hypotheses are maintained between stages, which quickly remove false positives from earlier stages while propagating correct hypotheses to the final stage. At the end of the final stage, candidates with high probabilities are selected as the candidates for the particular anatomic feature. Each classifier utilizes a set of discriminative features that are calculated in the context of the anatomic landmark to distinguish the positive target from negatives. These are the same features used to train the classifiers based on the training data. According to a possible implementation, Haar wavelet-like features, which are calculated using integral image-based techniques, can be used for the classifiers at the translation stage, and steerable features are used for classifiers at the orientation and scale stages because their computation does not require volume rotation and re-scaling, which are computationally expensive.

At step 106, a joint context is constructed for each possible combination of the landmarks. The joint context of multiple landmarks uses a mapping to combine the individual contexts of the landmarks. The mapping may be determined by generating a model that relates the landmarks based on annotated training data.

A joint context operator C is defined to represent the context of an object O, whose parameters are represented by $\theta$, i.e., $C(O|\theta)$. For concise representation purpose, we use the notation $C(\theta)$, hereinafter. The operator C is applied to extract features (context information) from contextual appearance. For example, a series of Haar wavelet-like features or steerable features can be computed and selected by C. Joint context is defined as context across a set of landmarks. For two objects $O_1$ and $O_2$, which are represented by their respective parameters $\theta_1$ and $\theta_2$, the joint context (JC) is defined as:

$$JC = C(f(\theta_1, \theta_2)). \qquad (1)$$

JC is represented as appearance and encodes the shape by calculating a geometric relationship through the mapping f.

According to an embodiment of the present invention, a two-dimensional bounding box is associated with each target landmark and its derived context. Each bounding box is specified by a five-parameter set $\theta$, including two position parameters $\langle x, y \rangle$, one orientation parameter $\langle \phi \rangle$, and two scale parameters $\langle sx, sy \rangle$. As described above, for each landmark, the landmark detection step detects the context defined by this parameter set. A mapping f between multiple landmarks can be determined by calculating a geometric relationship between landmarks in the annotated training data. Using the mapping f, the joint context is calculated for each possible combination of the landmark candidates detected in step 104.

At step 108, the best combination of landmark candidates is determined using a trained joint context detector. The trained joint context classifier is trained based on the joint context of the annotated training images. The joint context detector computes the posterior probability of the joint context hypothesis that is determined by its parameter set i.e., positions, orientation, and scales. The joint context detector can be trained as a PBT classifier using features, such as Haar wavelet-like features and steerable features. The best combination of anatomic landmark candidates can be determined based on a fusion of information of the probability determined by joint context detector, and the probabilities determined by each individual landmark detector. The individual anatomic landmark candidates in the combination gives detection results for the positions of the anatomic landmarks.

At step 110, the anatomic landmark detection results are output. The detection results can be output by displaying the detected anatomic landmarks as an image on a display device of a computer system. It is also possible that the anatomic landmark detection results can be output by storing the anatomic landmarks to a memory or storage of a computer system or another computer readable medium.

Figure 2:
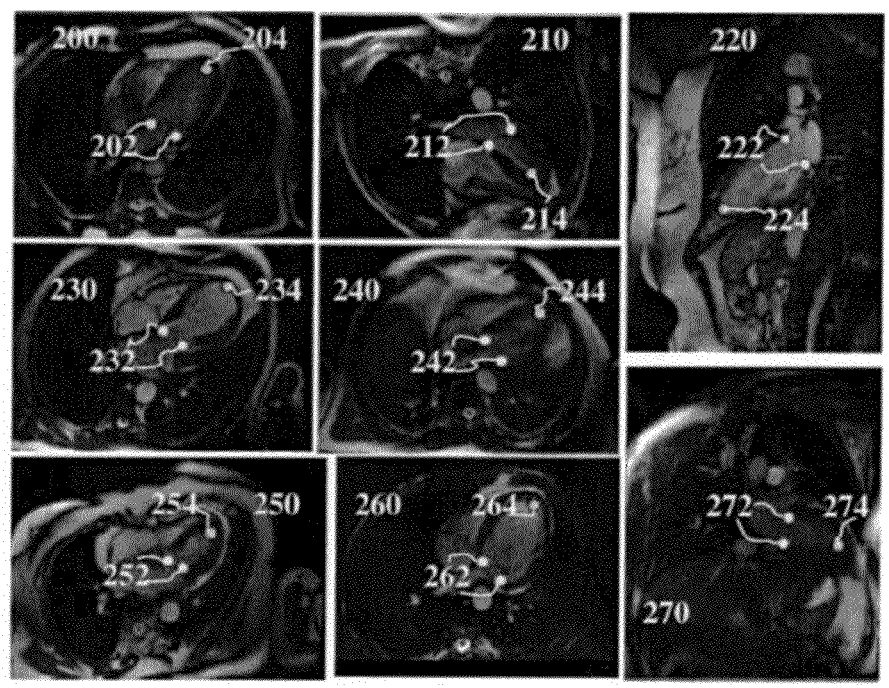
FIG. 2 illustrates exemplary MR long axis slices.

An exemplary implementation of the method of FIG. 1 for detecting left ventricle landmarks in an MR long axis slice is described below in FIG. 3. This method of landmark detection using joint context is particularly applicable to landmark set detection in MR long axis slices, due to varying MR acquisition parameters and large anatomy shape and appearance variations in different patients. Furthermore, a number of different anatomies other than the heart appear in the same slice. For a particular patient, time sampling across the entire heart beat cycle, with end-diastole (ED) and end-systole (ES) as two ends, can also lead to significantly different myocardium contour shape changes. These variations and ambiguities can lead to challenges for each individual landmark detector to indentify correct landmarks. FIG. 2 illustrates exemplary MR long axis slices. As illustrated in FIG. 2, each MR long axis slice 200, 210, 220, 230, 240, 250, 260, and 270 shows target landmarks of the basal annulus points 202, 212, 222, 232, 242, 252, 262, and 272 and the apex 204, 214, 224, 234, 244, 254, 264, and 274. According to embodiments of the present invention, joint context based detection is used to detect a joint context for the two basal annulus points to define a base plane, and to detect a joint context for the apex and the base plane.

Figure 3:
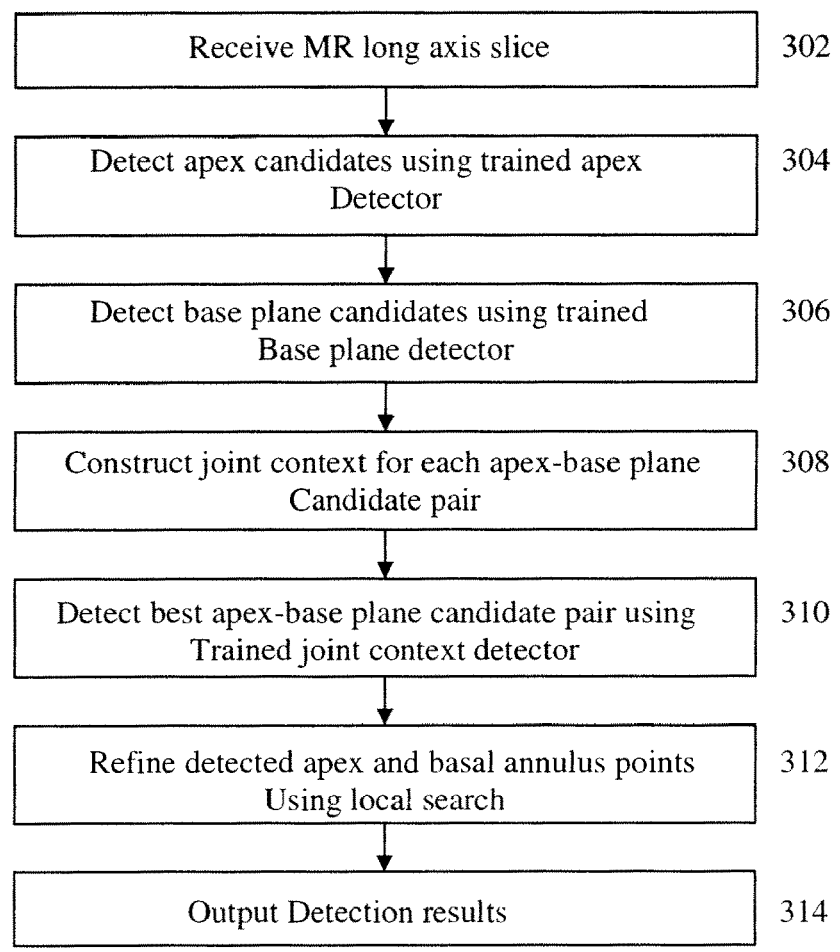
FIG. 3 illustrates a method of left ventricle landmark detection in an MR long axis slice according to an embodiment of the present invention.
Figure 4:
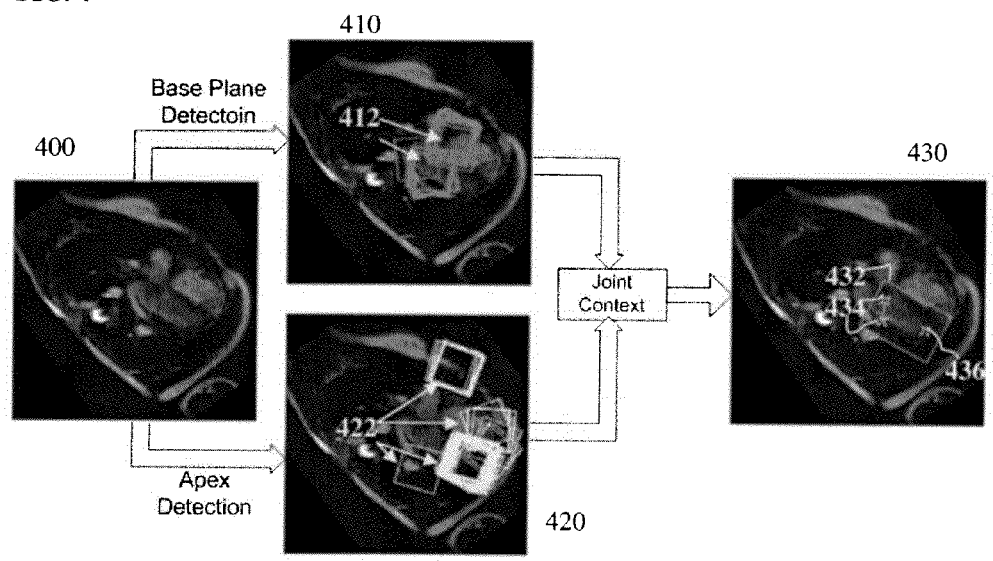
FIG. 4 illustrates exemplary results of the method steps of the landmark detection method of FIG. 3.

FIG. 3 illustrates a method of left ventricle landmark detection in an MR long axis slice according to an embodiment of the present invention. The method of FIG. 3 transforms MR image data representing at least a cardiac region of a patient to detect locations of the annulus points and the apex of the left ventricle. At step 302, an MR long axis slice is received. The MR long axis slice is a 2D MR image of at least a cardiac region of a patient. The MR long axis slice can be received directly from an MR scanning device, or received by loading an MR long axis slice that has been previously stored, for example on a memory or storage of a computer system or another computer readable medium. FIG. 4 illustrates exemplary results of the method steps of the landmark detection method of FIG. 3. As illustrated in FIG. 4, image 400 shows a MR long axis slice.

At step 304, apex candidates are detected in the MR long axis slice using a trained apex detector. The apex detector can detect candidates for the context of the apex using MSL with a series of classifiers, as described above. The apex is a well-known anatomical landmark of the LV. Each apex candidate can be visually represented as a box surrounding the LV apex. Although the apex is a point, it is detected as a region (context) by defining an oriented box around the apex. In this way, the orientation and size information of the surrounding region can be exploited to distinguish the apex from other confusing points. According to an advantageous implementation, the top M apex candidates resulting from the apex detection can be retained (e.g., M=100). In this step, selection of the top apex candidates is based on the detection score. The trained apex detector will assign a high score to a good candidate (close to the true position) and a low score to a bad candidate (far away from the true position). Referring to FIG. 4, image 420 shows exemplary results of apex detection results in the MR long axis slice 400. As shown in image 420, apex candidates 422 are detected in the MR long axis slice.

Returning to FIG. 3, at step 306, base plane candidates are detected using a trained based plane detector. Each base plane candidate can be visually represented as a box centered at the basal center (the mitral valve center) and enclosing the annulus points of the mitral valve. According to an advantageous embodiment of the present invention, the top N base plane candidates resulting from the base plane detection can be retained (e.g., N=100). The base plane candidates can be detected using MSL with a series of classifiers, as described above. In this step, selection of the top base plane candidates is based on the detection score. The base plane detector will assign a high score to a good candidate (close to the true position) and a low score to a bad candidate (far away from the true position). According to an embodiment of the present invention, the base plane is a joint context of two detected basal annulus points. Accordingly, an annulus point detector detects annulus point candidates, and base plane context hypotheses are generated by constructing a joint context from combinations of the annulus point candidates (see Table 1 below). The base plane detector then searches the base plane hypotheses to detect the top N base plane candidates. Referring to FIG. 4, image 410 shows exemplary base plane detection results in the MR long axis slice 400. As shown in image 410, base plane candidates 412 are detected in the MR long axis slice.

At step 308, a joint context is generated for each apex-base plane candidate pair. Each combination of apex candidate and base plane candidate is used to generate a joint context hypotheses for joint context detection, resulting in M×N joint context hypotheses. As described above, the joint context of multiple landmarks uses a mapping to combine the individual contexts of the landmarks. The mapping may be determined by generating a model that relates the landmarks based on annotated training data. As shown in Equation (1), for two objects $O_1$ (apex) and $O_2$ (base plane), which are represented by their respective parameters $\theta_1$ and $\theta_2$, the joint context (JC) is defined as $JC = C(f(\theta_1, \theta_2))$, where f is a mapping that defines a geometric relationship between the object parameters.

As described above, a two-dimensional bounding box is associated with each target landmark and its derived context. Each bounding box is specified by a five-parameter set $\theta$, including two position parameters $\langle x, y \rangle$, one orientation parameter $\langle \phi \rangle$ and two scale parameters $\langle sx, sy \rangle$. Although positions may be only used as the final output, orientation and scales are useful in encoding proper and consistent context as learned during the offline training process, where a set of contextual models/classifiers are trained.

According to an embodiment of the present invention, to learn contextual models relating the target landmarks (i.e., the mapping f in Equation (1)), a set of cardiac long axis images are collected and the landmark positions are annotated therein. Based on this annotated training set, a contextual model is built for each target object and a joint contextual model for the pair of <apex, base plane>. Let $\langle x_a, y_a \rangle$, $\langle x_{b1}, y_{b1} \rangle$, $\langle x_{b2}, y_{b2} \rangle$ denote the positions of apex, and two basal points, respectively. The contextual parameter sets for the base plane and for the apex-base plane combination are constructed as shown in Table 1 below.

TABLE 1

Context construction (mapping f in Eq. (1)). $<x_a, y_a>$, $<x_{b1}, y_{b1}>$, and $<x_{b2}, y_{b2}>$ denote the positions of the apex, and two basal annulus points, repectively. Base Plane (BP) context is obtained from two basal annulus points. Joint context of $<$Apex, Base Plane$>$ depends on the apex and the two basal annulus points.

|  | Positions | Orientation |
| --- | --- | --- |
| Apex | $x_a = x_a$<br>$y_a = y_a$ | $phi_a = \arctan\dfrac{(y_a - (y_{b1} + y_{b2})/2)}{(x_a - (x_{b1} + x_{b2})/2)}$ |
| Joint context<br>BP | $x_b = (x_{b1} + x_{b2})/2$<br>$y_b = (y_{b1} + y_{b2})/2$ | Orthogonal to the line segment connecting the two basal annulus points, and pointing toward the apex |
| Joint context<br>$<$Apex, BP$>$ | $x_{jc} = (x_a + x_b)/2$<br>$y_{jc} = (y_a + y_b)/2$ | $\phi_{jc} = \arctan\dfrac{y_a - (y_{b1} + y_{b2})/2}{x_a - (x_{b1} + x_{b2})/2}$ |

|  | Scales |
| --- | --- |
| Apex | $sx_a = \sqrt{(y_{b2}-y_{b1})^2 + (x_{b2}-x_{b1})^2} * 1.8$<br>$sy_a = sx_a$ |
| Joint context<br>BP | $sx_b = \sqrt{(y_{b2}-y_{b1})^2 + (x_{b2}-x_{b1})^2} * 1.8$<br>$sy_b = sx_b$ |
| Joint context<br>$<$Apex, BP$>$ | $sx_{jc} = \sqrt{(y_a-y_b)^2 + (x_a-x_b)^2} * 1.5$<br>$sy_{jc} = \sqrt{(y_{b2}-y_{b1})^2 + (x_{b2}-x_{b1})^2} * 1.8$ |

Using the contextual models shown in Table 1, each apex-base plane candidate pair is mapped to a joint context hypothesis. It is to be understood that the models of Table 1 are exemplary, and other models may be used for joint context mapping as well.

At step 310, the best apex-base plane candidate pair is determined using a trained joint context detector. As described above, the joint context detector is trained based on annotated training data using PBT to determine a probability for each joint context hypothesis. According to an advantageous embodiment of the present invention the final determination of the best apex-candidate can be determined by fusing information from the joint context detector, the apex detector, and the base plane detector. In this case, the determination of the final best candidate pair is based on three pieces of evidence, including the joint context score ($p_j$) determined by the joint context detector for joint context of the apex-base plane candidate pair, individual apex score ($p_a$) determined by the apex detectors, and individual base plane score ($p_b$). The final score p is calculated as:

$$p = p_j * (p_a + p_b)/2. \quad (2)$$

The apex-base plane candidate pair with the highest score p is selected as the best candidate pair. This candidate pair gives the location of the apex and two basal annulus points. Referring to FIG. 4, image 430 shows exemplary joint context detection in the MR long axis slice 400. Image 430 shows the joint context 432 of the best apex-base plane candidate pair, the detected apex 436 and the detected basal annulus points 434.

Returning to FIG. 3, at step 312, the detected landmarks resulting from step 310 are refined using local searches. For example, the individual landmark detectors for detecting the apex and the annulus points can be used to search in a constrained space around the detected landmarks to refined the detected landmarks. It is also possible that additional discriminative landmark detectors can be trained to search in the constrained space to fine-tune the landmark detection results.

At step 314, the landmark detection results are output. The landmark detection results can be output by displaying the detected anatomic landmarks (apex and annulus points) as an image on a display device of a computer system. It is also possible that the anatomic landmarks detection results can be output by storing the landmark detection results to a memory or storage of a computer system or another computer readable medium.

Figure 5:
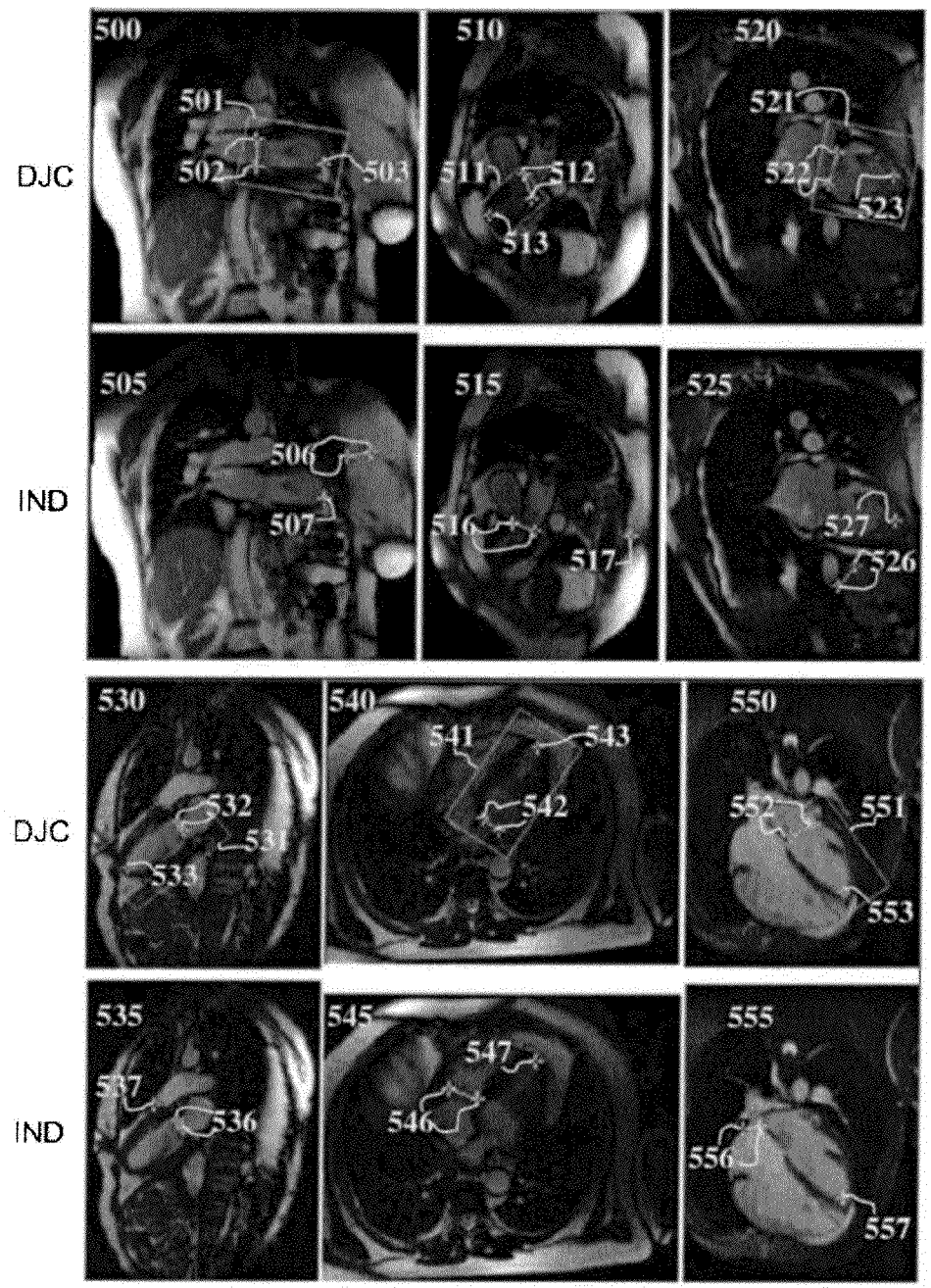
FIG. 5 illustrates exemplary landmark detection results using the method of FIG. 3.

FIG. 5 illustrates exemplary landmark detection results using the method of FIG. 3. As illustrated in FIG. 5, images 505, 515, 525, 535, 545, and 555 are long axis MR image slices showing the final detected basal annulus points 506, 516, 526, 536, 546, 556, and 566, and apexes 507, 517, 527, 537, 547, and 557 using only individual landmark detectors. Images 500, 510, 520, 530, 540, and 550 show final detection results using the joint context based detection of FIG. 3 in MR long axis image slices respectively corresponding to images 505, 515, 525, 535, 545, and 555. In particular, images 500, 510, 520, 530, 540, and 550 show the detected joint context 501, 511, 521, 531, 541, and 551, detected basal annulus points 502, 512, 522, 532, 542, and 552, and detected apexes 503, 513, 523, 533, 543, and 553 using the method of FIG. 3.

Figure 6:
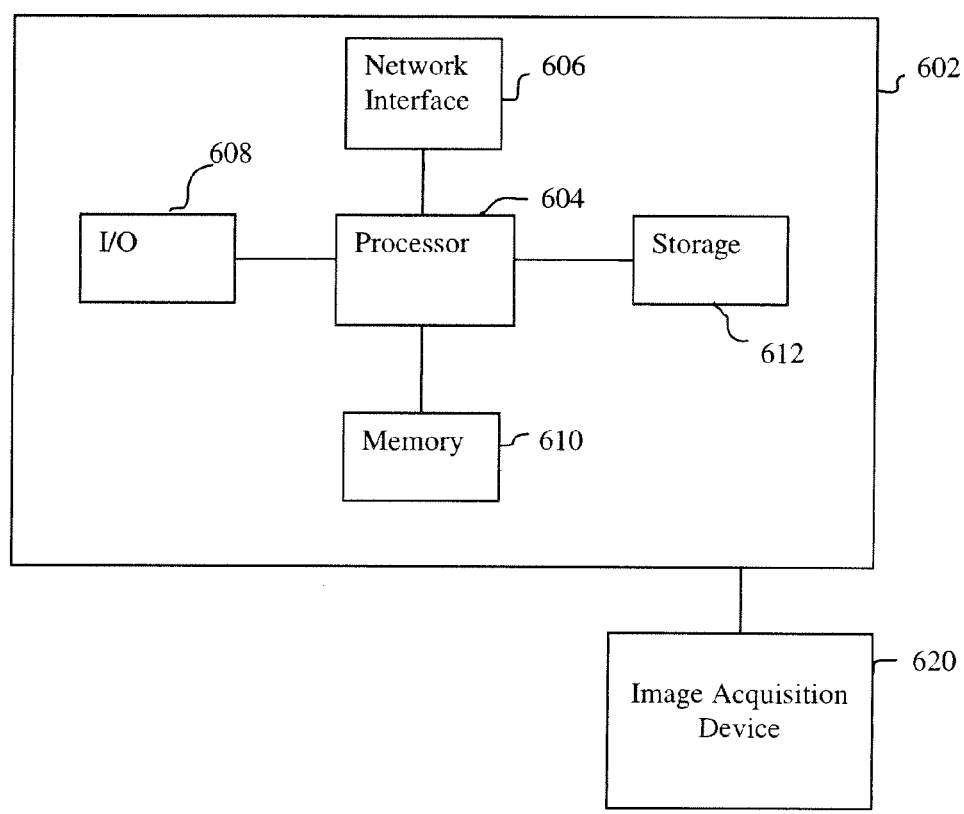
FIG. 6 is a high level block diagram of a computer capable of implementing the present invention.

The above-described methods for anatomic landmark detection in medical images may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operations. The computer program instructions may be stored in a storage device 612, or other computer readable medium (e.g., magnetic disk, CD ROM, etc.) and loaded into memory 610 when execution of the computer program instructions is desired. Thus, the steps of the method of FIGS. 1 and 3 may be defined by the computer program instructions stored in the memory 610 and/or storage 612 and controlled by the processor 604 executing the computer program instructions. An image acquisition device 620, such as an MR scanning device, can be connected to the computer 602 to input medical images to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting anatomic landmarks of a left ventricle (LV) in a magnetic resonance (MR) long axis image slice, comprising:

detecting a plurality of apex candidates in the MR long axis image slice using a trained apex detector;

detecting a plurality of base plane candidates in the MR long axis image slice using a trained base plane detector;

generating a joint context for each apex-base plane candidate pair; and determining a best apex-base plane candidate pair based on the generated joint context using a trained joint context detector.

2. The method of claim 1, wherein said step of detecting a plurality of base plane candidates in the MR long axis image slice using a trained base plane detector comprises:

detecting a plurality of basal annulus point candidates in the MR long axis image slice using a trained annulus point detector;

generating base plane hypotheses by generating a joint context for combinations of detected basal annulus point candidates; and detecting the plurality of base plane candidates from the base plane hypotheses using the trained base plane detector.

3. The method of claim 1, wherein the apex candidates and the base plane candidates are detected using marginal space learning (MSL).

4. The method of claim 1, wherein the joint context of the apex-base plane candidate pairs is detected using probabilistic boosting tree (PBT).

5. The method of claim 1, wherein said step of generating a joint context for each apex-base plane candidate pair comprises, for each apex-base plane candidate pair:

mapping parameters of the apex candidate and parameters of the base plane candidate using a mapping function to determine parameters of the joint context.

6. The method of claim 5, wherein said mapping function defines a geometric relationship between the parameters of the apex candidate and the parameters of the base plane candidate.

7. The method of claim 1, wherein said step of determining a best apex-base plane candidate pair based on the generated joint context using a trained joint context detector comprises:

determining the best apex-base plane candidate based on fusion of a probability determined by the joint context detector, a probability determined by the apex detector, and a probability determined by the base plane detector.

8. The method of claim 7, wherein said step of determining the best apex-base plane candidate based on fusion of a probability determined by the joint context detector, a probability determined by the apex detector, and a probability determined by the base plane detector comprises:

selecting an apex-base plane candidate with a best probability score:

$$p = p_j * (p_a + p_b)/2,$$

where $p_j$ denotes the probability determined by the joint context detector, $p_a$ denotes the probability determined by the apex detector, and $p_b$ denotes the probability determined by the base plane detector.

9. The method of claim 1, wherein detected positions of the apex and basal annulus points of the LV are defined by the best apex-base plane pair, further comprising:

refining the detected positions of the apex and basal annulus points using local searches constrained based on the detected positions of the apex and basal annulus points.

10. An apparatus for detecting anatomic landmarks of a left ventricle (LV) in a magnetic resonance (MR) long axis image slice, comprising:

means for detecting a plurality of apex candidates in the MR long axis image slice using a trained apex detector;

means for detecting a plurality of base plane candidates in the MR long axis image slice using a trained base plane detector;

means for generating a joint context for each apex-base plane candidate pair; and means for determining a best apex-base plane candidate pair based on the generated joint context using a trained joint context detector.

11. The apparatus of claim 10, wherein said means for detecting a plurality of base plane candidates in the MR long axis image slice using a trained base plane detector comprises:

means for detecting a plurality of basal annulus point candidates in the MR long axis image slice using a trained annulus point detector;

means for generating base plane hypotheses by generating a joint context for combinations of detected basal annulus point candidates; and means for detecting the plurality of base plane candidates from the base plane hypotheses using the trained base plane detector.

12. The apparatus of claim 10, wherein the apex candidates and the base plane candidates are detected using marginal space learning (MSL).

13. The apparatus of claim 10, wherein the joint context of the apex-base plane candidate pairs is detected using probabilistic boosting tree (PBT).

14. The apparatus of claim 10, wherein said means for generating a joint context for each apex-base plane candidate pair comprises:

means for mapping parameters of an apex candidate and parameters of a base plane candidate using a mapping function to determine parameters of the joint context for the apex candidate and the base plane candidate.

15. The apparatus of claim 14, wherein said mapping function defines a geometric relationship between the parameters of the apex candidate and the parameters of the base plane candidate.

16. The apparatus of claim 10, wherein said means for determining a best apex-base plane candidate pair based on the generated joint context using a trained joint context detector comprises:

means for determining the best apex-base plane candidate based on fusion of a probability determined by the joint context detector, a probability determined by the apex detector, and a probability determined by the base plane detector.

17. The apparatus of claim 16, wherein said means for determining the best apex-base plane candidate based on fusion of a probability determined by the joint context detector, a probability determined by the apex detector, and a probability determined by the base plane detector comprises:

means for selecting an apex-base plane candidate with a best probability score:

$$p = p_j * (p_a + p_b)/2,$$

where $p_j$ denotes the probability determined by the joint context detector, $p_a$ denotes the probability determined by the apex detector, and $p_b$ denotes the probability determined by the base plane detector.

18. The apparatus of claim 10, wherein detected positions of the apex and basal annulus points of the LV are defined by the best apex-base plane pair, further comprising:

means for refining the detected positions of the apex and basal annulus points using local searches constrained based on the detected positions of the apex and basal annulus points.

19. A non-transitory computer readable medium encoded with computer executable instructions for detecting anatomic landmarks of a left ventricle (LV) in a magnetic resonance (MR) long axis image slice, the computer executable instructions when executed on a processor configures the processor to implement steps comprising:
  detecting a plurality of apex candidates in the MR long axis image slice using a trained apex detector;
  detecting a plurality of base plane candidates in the MR long axis image slice using a trained base plane detector;
  generating a joint context for each apex-base plane candidate pair; and
  determining a best apex-base plane candidate pair based on the generated joint context using a trained joint context detector.

20. The computer readable medium of claim 19, wherein the computer executable instructions defining the step of detecting a plurality of base plane candidates in the MR long axis image slice using a trained base plane detector comprise computer executable instructions defining the steps of:
  detecting a plurality of basal annulus point candidates in the MR long axis image slice using a trained annulus point detector;
  generating base plane hypotheses by generating a joint context for combinations of detected basal annulus point candidates; and
  detecting the plurality of base plane candidates from the base plane hypotheses using the trained base plane detector.

21. The computer readable medium of claim 19, wherein the apex candidates and the base plane candidates are detected using marginal space learning (MSL).

22. The computer readable medium of claim 19, wherein the joint context of the apex-base plane candidate pairs is detected using probabilistic boosting tree (PBT).

23. The computer readable medium of claim 19, wherein the computer executable instructions defining the step of generating a joint context for each apex-base plane candidate pair comprise computer executable instructions defining the step of, for each apex-base plane candidate pair:
  mapping parameters of the apex candidate and parameters of the base plane candidate using a mapping function to determine parameters of the joint context.

24. The computer readable medium of claim 23, wherein said mapping function defines a geometric relationship between the parameters of the apex candidate and the parameters of the base plane candidate.

25. The computer readable medium of claim 19, wherein the computer executable instructions defining the step of determining a best apex-base plane candidate pair based on the generated joint context using a trained joint context detector comprise computer executable instructions defining the step of:
  determining the best apex-base plane candidate based on fusion of a probability determined by the joint context detector, a probability determined by the apex detector, and a probability determined by the base plane detector.

26. The computer readable medium of claim 25, wherein the computer executable instructions defining the step of determining the best apex-base plane candidate based on fusion of a probability determined by the joint context detector, a probability determined by the apex detector, and a probability determined by the base plane detector comprise computer executable instructions defining the step of:
  selecting an apex-base plane candidate with a best probability score:

$$p=p_j*(p_a+p_b)/2,$$

where $p_j$ denotes the probability determined by the joint context detector, $p_a$ denotes the probability determined by the apex detector, and $p_b$ denotes the probability determined by the base plane detector.

27. The computer readable medium of claim 19, wherein detected positions of the apex and basal annulus points of the LV are defined by the best apex-base plane pair, further comprising computer executable instructions defining the step of:
  refining the detected positions of the apex and basal annulus points using local searches constrained based on the detected positions of the apex and basal annulus points.

28. A method of detecting a plurality of anatomic landmarks in a medical image comprising:
  individually detecting candidates for each of the plurality of landmarks in the medical image using trained detectors corresponding to each of the plurality of landmarks;
  generating a joint context for each combination of the candidates detected for the plurality of landmarks; and
  detecting positions of the plurality of landmarks in the medical image by determining a best combination of landmarks based on the generated joint context using a trained joint context detector.

29. The method of claim 28, wherein the plurality of anatomic landmarks are semantically related to each other.

30. The method of claim 29, wherein the plurality of anatomic landmarks are parts of the same anatomical structure.

31. The method of claim 29, wherein said step of generating a joint context for each combination of the candidates detected for the plurality of landmarks comprises:
  mapping parameters of the plurality of landmarks using a mapping function that defines the semantic relationship between the landmarks to generate parameters of the joint context.

* * * * *